United States Patent
Sampaoli et al.

(10) Patent No.: US 10,149,570 B2
(45) Date of Patent: Dec. 11, 2018

(54) DEVICE FOR WETTING A DOSE OF GROUND COFFEE IN COFFEE MACHINES HAVING A HEATING ELEMENT ON THE DISPENSER UNIT, AND WETTING PROCESS

(71) Applicant: Gruppo Cimbali S.p.A., Binasco (IT)

(72) Inventors: Davide Sampaoli, Binasco (IT); Andrea Casali, Binasco (IT)

(73) Assignee: GRUPPO CIMBALI S.P.A. (IT)

( * ) Notice: Subject to any disclaimer, the term of this patent is extended or adjusted under 35 U.S.C. 154(b) by 62 days.

(21) Appl. No.: 14/748,664

(22) Filed: Jun. 24, 2015

(65) Prior Publication Data

US 2015/0374168 A1 Dec. 31, 2015

(30) Foreign Application Priority Data

Jun. 27, 2014 (IT) ................. MI2014A1182

(51) Int. Cl.
*A47J 31/36* (2006.01)
*A47J 31/40* (2006.01)
(Continued)

(52) U.S. Cl.
CPC ............ *A47J 31/56* (2013.01); *A23F 5/262* (2013.01); *A47J 31/002* (2013.01); *A47J 31/46* (2013.01); *A47J 31/465* (2013.01)

(58) Field of Classification Search
CPC ......... A23F 5/262; A47J 31/002; A47J 31/46; A47J 31/465; A47J 31/56; A47J 31/007; A47J 31/36; A47J 31/4428; A47J 31/061
(Continued)

(56) References Cited

U.S. PATENT DOCUMENTS 3,374,727 A * 3/1968 Wright ................. A47J 31/408
99/282
5,259,297 A * 11/1993 Giuliano ............... A47J 31/007
99/282
(Continued)

FOREIGN PATENT DOCUMENTS

EP 0 934 719 A1 8/1999
EP 1 360 918 A1 11/2003
(Continued)

*Primary Examiner* — Joseph M Pelham
(74) *Attorney, Agent, or Firm* — Alan G. Towner, Esq.; Leech Tishman Fuscaldo & Lampl

(57) ABSTRACT

A device for wetting a dose of ground coffee in coffee machines, such as espresso machines, particularly but without limitation professional espresso making machines is disclosed. The device includes a source of pressurized water, at least one beverage dispenser unit, a filter holder removably coupled to said dispenser, a water heater placed on the dispenser unit, a water supply system connecting said source of pressurized water with said heater, and a dispensing conduit connecting the heater with the dispenser unit. The device also includes a dispensing valve device inserted in said dispensing conduit for closing and opening the conduit and for feeding heated water to the filter holder and cause it to spread into the dose of ground coffee contained in the filter holder, as well as an electronic control and programming unit connected at least with said source of pressurized water, with said heater and with said dispensing valve device.

7 Claims, 1 Drawing Sheet

(51) Int. Cl.
- *A47J 31/52* (2006.01)
- *A47J 31/54* (2006.01)
- *A23F 5/26* (2006.01)
- *A47J 31/56* (2006.01)
- *A47J 31/46* (2006.01)
- *A47J 31/00* (2006.01)

(58) Field of Classification Search
USPC ......... 99/275, 279, 281, 288, 295, 300, 280, 99/282, 283, 286, 287, 291, 293, 294, 99/297, 327, 323.1, 323.2, 323.3, 467; 219/297, 332, 333, 327, 335, 494
See application file for complete search history.

(56) References Cited

U.S. PATENT DOCUMENTS

| | | | | |
|---|---|---|---|---|
| 5,267,506 | A * | 12/1993 | Cai | A47J 31/30 99/280 |
| 5,778,765 | A * | 7/1998 | Klawuhn | A47J 31/46 99/290 |
| 7,673,557 | B2 * | 3/2010 | Bienvenu | A47J 31/3676 99/290 |
| 9,820,605 | B2 * | 11/2017 | Coccia | A47J 31/40 |
| 2006/0005712 | A1 * | 1/2006 | Greenwald | A47J 31/465 99/275 |
| 2007/0062377 | A1 * | 3/2007 | Stieger | A47J 31/007 99/279 |
| 2009/0293733 | A1 * | 12/2009 | Martin | A47J 31/60 99/280 |
| 2010/0112165 | A1 * | 5/2010 | Masciandaro | A47J 31/405 426/433 |
| 2010/0203209 | A1 * | 8/2010 | Fishbein | A47J 31/18 426/433 |
| 2011/0097454 | A1 * | 4/2011 | Coccia | A47J 31/36 426/231 |
| 2014/0053734 | A1 * | 2/2014 | Santi | A47J 31/0647 99/282 |
| 2014/0208955 | A1 * | 7/2014 | Yui | B67D 1/0857 99/295 |
| 2015/0208851 | A1 * | 7/2015 | Grassia | A47J 31/0652 99/283 |
| 2016/0007798 | A1 * | 1/2016 | Jimenez | A47J 31/56 99/281 |
| 2017/0135515 | A1 * | 5/2017 | Buettiker | A47J 31/002 |
| 2017/0290458 | A1 * | 10/2017 | Burrows | A47J 31/3628 |
| 2017/0290461 | A1 * | 10/2017 | Bentley | A47J 31/407 |

FOREIGN PATENT DOCUMENTS

| | | |
|---|---|---|
| EP | 2 133 011 A1 | 12/2009 |
| EP | 2 314 182 A1 | 4/2011 |
| EP | 2 314 183 A1 | 4/2011 |

* cited by examiner

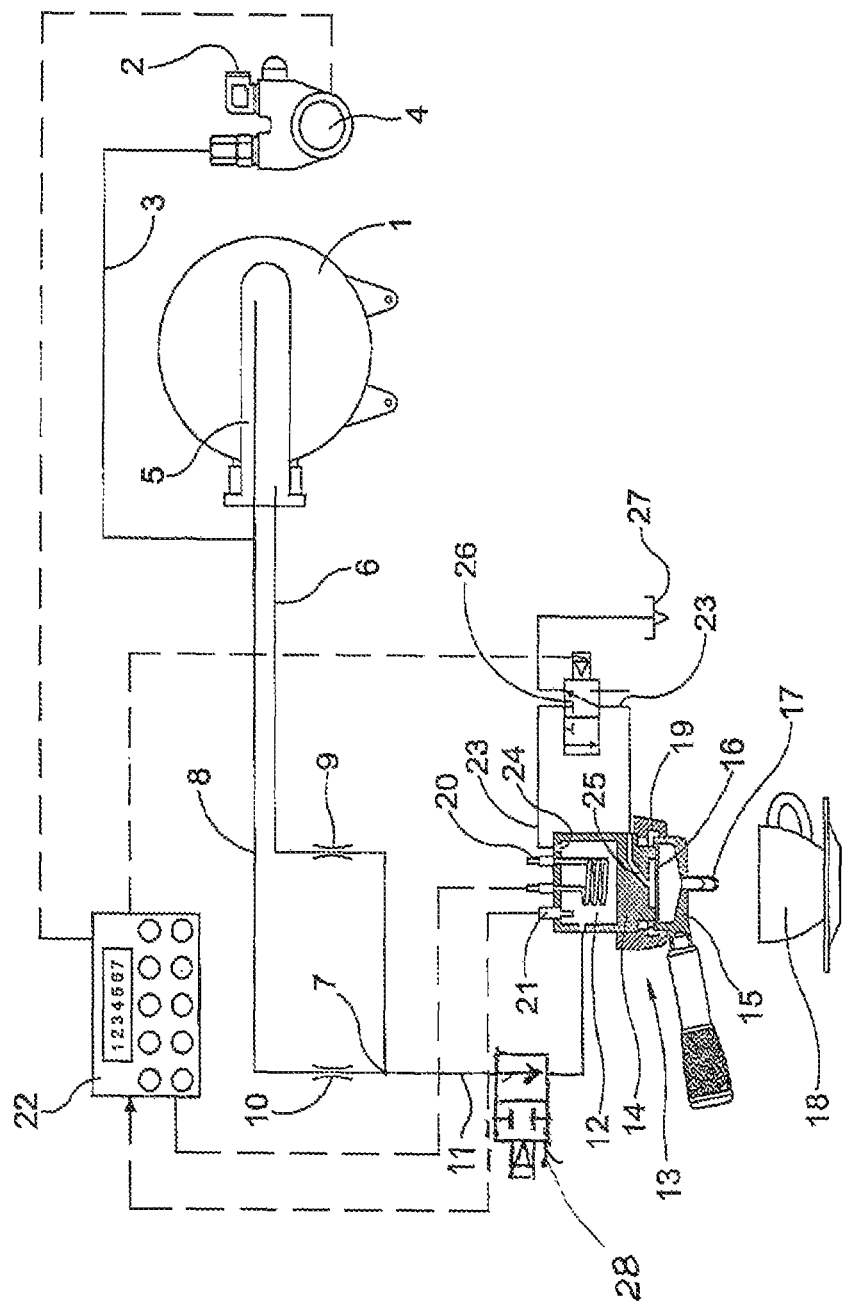

DEVICE FOR WETTING A DOSE OF GROUND COFFEE IN COFFEE MACHINES HAVING A HEATING ELEMENT ON THE DISPENSER UNIT, AND WETTING PROCESS

CROSS-REFERENCE TO RELATED APPLICATION

This application claims priority to Italian Patent Application No. MI2014A001182 filed Jun. 27, 2014, which is incorporated herein by reference.

FIELD OF THE INVENTION

The present invention relates to an improved device for wetting a dose of ground coffee in coffee machines, preferably espresso machines, comprising a source of pressurized water, at least one beverage dispenser unit, a filter holder removably coupled to said dispenser, a water heater placed on the dispenser unit, a water supply system, connecting said source of pressurized water with said heater, a dispensing conduit connecting the heater with the dispenser unit, as well as a dispensing valve device inserted in said dispensing conduit for closing and opening the conduit and for feeding heated water to the filter holder and cause it to spread into the dose of ground coffee contained in the filter holder, as well as an electronic control and programming unit connected at least with said source of pressurized water, with said heater and with said dispensing valve device.

Alternatively, the machine may also comprise a water-heating boiler disposed in the water supply system between the source of pressurized water and the heater placed on the dispenser unit, the boiler being preferably equipped with a traditional heat exchanger.

Preferably, the machine has a plurality of dispenser units.

BACKGROUND INFORMATION

Espresso machines of the above mentioned type are known in the art, as described, for instance in EP-A-1 360 918, EP-A-2 314 183, EP-A-2 314 182, EP-A-2 133 011.

The invention also relates to the brewing process.

In actual use, coffee machines as described above have the drawback of a shorter time for wetting the dose of ground coffee as compared with traditional machines, whose wetting time usually ranges from 5 to 7 seconds from the time the dispensing valve is opened, which is deemed to be an optimal time in coffee machines to obtain proper dispersion of water through the dose of ground coffee.

As is known, the brewing or wetting time is the time required, from the moment the dispensing valve device is opened, for hot water to increase its pressure from a low value, generally slightly above 1 bar, to the traditional operating value of about 8-9 bar.

Coffee machines having an independent heater on each dispenser unit, which form the subject of the present invention, cannot ensure the above timings for pressure increase from the initial value of 1 bar to the operating value of 8-9 bar at which coffee is actually dispensed, due to their construction.

This is because, when the coffee dose dispensing procedure is started, the water heater on the dispenser is almost full of water and communicates with the source of pressurized water, traditionally represented as a pump, whereby it is almost instantaneously exposed to the operating pressure of the pump, which is about 8-9 bar.

Therefore, water is expelled out of the chamber of the heater, and brews the coffee in the filter holder, when it is actually already at the maximum operating pressure of 8-9 bar.

The object of the present invention is to obviate the above described drawback by providing a technical arrangement that allows the machines equipped with a heater on the dispenser unit to also ensure adjustable times for wetting the dose of ground coffee in the filter holder, and corresponding to the times that have been found in the art to be optimal, from the time the dispensing valve device is opened.

BRIEF DESCRIPTION OF THE DRAWING

The invention will be now described in greater detail with reference to the annexed drawing, FIG. 1, which schematically represents the hydraulic circuit of a coffee machine embodying the invention.

DETAILED DESCRIPTION

Referring to this FIG. 1, numeral 1 designates a traditional boiler for generating hot water and steam. This boiler receives cold water, as is known in the art, from a cold water source, referenced 2, which is external to the machine.

Such water source 2 feeds water through a conduit 3 and a pump 4 to a heat exchanger 5, also known in the art, in an espresso machine, i.e., in the boiler 1 thereof.

Heated water is fed from the outlet of such heat exchanger 5, through a conduit 6, to a mixing station 7, which is also in communication with a cold water conduit 8, connected to the conduit 3.

Respective flow regulators, referenced 9 and 10, are placed on the hot water conduit 6 and the cold water conduit 8, upstream from the mixing station 7.

These flow regulators allow cold water to be added to hot water to obtain a warm water flow at a predetermined temperature T1, e.g., from 40° C. to 50° C., in the conduit 11, such water flowing past the mixing station 7 to reach a heater 12 in the form of a small chamber mounted to the coffee dispensing device or unit, generally referenced 13.

Alternatively, the water source 2 may be directly connected to the heater 12 by a water supply system that comprises the hot water conduit 6, which may be directly connected to the heater 12 without the provision of the boiler 1 and the heat exchanger 5.

This dispenser unit 13 comprises, as is known in the art, a brewing body 14 which, in the illustrated example, consists of the base of the chamber of the heater 12, and a brewing unit consisting of a filter holder 15, with a filter 16 and a coffee-dispensing nozzle 17 below which a collecting cup 18 is operably placed, as is also known in the art.

Connection means 19 are provided on the brewing body 14 for removable connection of the filter holder 15.

An electrical resistor 20 is placed within the chamber of the heater 12, for heating water with a variable power, as it will be appreciated further on in the description, such that a water temperature T3 higher than the operating temperature T2, which ranges from 60° C. to 110° C., is obtained for a short time within the heater 12, as required from the system as the best temperature for coffee formation.

The operation of the heating resistor 20 is controlled by a temperature sensor 21 and a central processing unit (CPU) or electronic control and programming unit, schematically designated as 22.

Water from the chamber of the heater 12 is conveyed to the brewing unit, i.e., the filter holder 15, through a conduit 23 which connects the outlet 24 of the chamber of the heater 12 to the channel 25 formed in the dispenser body 14, and ends directly upstream from the filter 16.

A dispensing valve device 26, e.g., a solenoid valve, is placed in the conduit 23, and is also controlled by the electronic control and programming unit 22.

This dispensing valve device 26 has one position in which it causes water to be fed to the filter holder for beverage formation, and another position on which it stops water feeding and communicates with a drain 27, external to the machine.

According to the invention, an additional valve device 28 will be placed on the hot water conduit 11 or the conduit 3, if the heater 12 is directly connected with the water source 2.

The valve device 28, which is also preferably a solenoid valve, is connected to electronic control and programming unit 22 to be opened and closed in accordance with what will be described below.

This valve device 28 is open in its rest state, with the chamber of the heater device 12 being in fluid communication with the pump 4, irrespective of whether the coffee machine is equipped with a boiler 1, possibly having its heat exchanger 5, in addition to the heater device 12 on each dispenser 13, or the pump 4 is directly connected to the heater device 12 without the provision of flow regulators 9 and 10 or the boiler 1.

According to the brewing process of the invention, whenever a coffee dispensing operation is selected by the operator, the dispensing valve device 26 is actuated and reaches its open state, thereby causing the valve device 28 to close either simultaneously or with a delay of 0 to 5 seconds, and to remain in such closed position for a programmable duration of time.

As long as the valve device 28 is closed, i.e., for a time that can be preferably selected from 0 seconds to a maximum of 10 seconds, the chamber of the heater 12 is no longer in fluid communication with the rest of the circuit upstream from the valve device 28 and the hot water that reaches the filter holder 15 only comes from the heater device 12 on the dispenser unit.

From the time the valve device 26 is opened and as long as the valve device 28 is closed, the heating element 20 is switched on by the control unit 22, with such a power as to cause water temperature to independently increase from the operating temperature value T2 that has been reached in the heating device 12, without being subject to monitoring by the electronic control and programming unit 22 through the temperature sensor 21 in the heating device 12, but with no safety risk.

The water in the heater device 12 increases its temperature from the operating value T2 to a value T3, with an increase of 1-5° C., preferably 2° C.

As temperature increases, pressure also increases, and hot water is expelled out of the heater device toward the filter holder, to start wetting the coffee grounds at a pressure slightly above 1 bar.

Once the programmed closing time for the valve device 28 has elapsed, the latter assumes its open position again, thereby restoring fluid communication between the chamber of the heater device 12 and the pump 4 and increasing the pressure of water dispensed toward the filter holder 15 to the operating pressure of about 9±1 bar in a few instants.

Selection of the closing time for the valve device 28 will afford customization of the time during which hot water will be spread through the coffee grounds before reaching the operating pressure of about 9±1 bar.

For example, such closing time may be set to 5-7 seconds to reach optimal beverage dispensing performances and high beverage quality.

As soon as the valve device 28 moves back to its open position, the central electronic control and programming unit 22 resumes monitoring of the heating device 20 of the dispenser unit, such that the latter may be switched on, if needed, to maintain the temperature value programmed by the user throughout the beverage dispensing time.

What is claimed is:

1. A device for wetting a dose of ground coffee in espresso coffee making machines during the preparation of the beverage, comprising:
    a source of pressurized water;
    at least one beverage dispensing unit;
    a filter holder, removably coupled to said beverage dispensing unit;
    a water heater, placed on the beverage dispensing unit, said water heater being provided with a heating element;
    an electronic control and programming unit programmed to supply current to the heating element to heat the water in said water heater to a programmed temperature for dispensing the coffee beverage;
    a water supply system connecting said source of pressurized water to said water heater;
    a dispensing conduit connecting said water heater to said beverage dispensing unit;
    a dispensing valve device placed in said dispensing conduit structured and arranged to close and open the dispensing conduit and to feed heated water to said filter holder and cause it to spread into the dose of ground coffee contained in the filter holder,
    said electronic control and programming unit being connected at least to said source of pressurized water, to said heating element and to said dispensing valve device;
    an additional valve device placed in said water supply system which connects said source of pressurized water to said water heater;
    said additional valve device being connected to said electronic control and programming unit;
    said electronic control and programming unit being configured for opening said dispensing valve device, for closing said additional valve device and for keeping closed said additional valve device while said dispensing valve device is open as long as required for the dose of ground coffee in the filter holder to be wetted by the water flowing from said water heater.

2. The device according to claim 1, in which said electronic control and programming unit is further configured for closing said additional valve device simultaneously with the opening of said dispensing valve device.

3. The device according to claim 1, in which said electronic control and programming unit is further configured for closing said additional valve device with a time delay comprised between 0 and 5 seconds from the opening of said dispensing valve device.

4. The device according to claim 1, in which said electronic control and programming unit is further configured for raising the temperature of said heating element above its temperature set for heating the water in said water heater to a programmed operating temperature for dispensing the coffee beverage, when said additional valve device is closed and said dispensing valve device is open.

5. The device according to claim 1, further comprising a water heating boiler located between said source of pressurized water and said additional valve device.

6. The device according to claim 5, wherein said heating boiler comprises a heat exchanger.

7. The device according to claim 1, wherein said source of pressurized water comprises a pump.

* * * * *